(12) United States Patent
Brett

(10) Patent No.: US 6,452,642 B1
(45) Date of Patent: Sep. 17, 2002

(54) DIGITAL MANIPULATION OF VIDEO IMAGES

(75) Inventor: Stephen Brett, Sutton-at-Home (GB)

(73) Assignee: Pandora International Limited, Northfleet (GB)

( * ) Notice: Subject to any disclaimer, the term of this patent is extended or adjusted under 35 U.S.C. 154(b) by 0 days.

(21) Appl. No.: 09/544,578

(22) Filed: Apr. 6, 2000

(30) Foreign Application Priority Data

Apr. 7, 1999 (GB) ............................................. 9907943

(51) Int. Cl.$^7$ ................................................. H04N 9/74
(52) U.S. Cl. ........................ 348/578; 348/584; 348/586; 348/598; 382/282
(58) Field of Search .................................. 348/584, 585, 348/586, 587, 598, 592, 700, 701; 382/167, 162, 282; H04N 9/74, 9/76

(56) References Cited

U.S. PATENT DOCUMENTS

| | | | | |
|---|---|---|---|---|
| 5,216,504 A | * | 6/1993 | Webb et al. ................. | 348/190 |
| 5,450,500 A | * | 9/1995 | Brett .......................... | 382/162 |
| 5,515,485 A | | 5/1996 | Luquet et al. .............. | 395/135 |
| 5,874,988 A | * | 2/1999 | Gu .............................. | 348/97 |
| 6,097,853 A | * | 8/2000 | Gu et al. .................... | 382/282 |

FOREIGN PATENT DOCUMENTS

| WO | WO 9510919 | 4/1995 | ............ H04N/7/18 |
|---|---|---|---|

* cited by examiner

*Primary Examiner*—John Miller
*Assistant Examiner*—Trang U. Tran
(74) *Attorney, Agent, or Firm*—McDonnell Boehnen Hulbert & Berghoff

(57) ABSTRACT

A method for the digital manipulation of a video image, in which an object is located and replaced by another object. To account for ambient lighting effects, a base set of appearance parameter values for the first object is determined, such as average values of hue, saturation and luminance. Selected regions of the object are analysed and in respect of each selected region the extent to which actual appearance parameter values deviate from the base set of apparatus parameter values is determined. The method includes storing data representation of the positions of the regions and the respective deviations from the base set of values. The first object is replaced by a second object, and the method then includes the step of applying to regions of the second object adjustments to appearance parameter values by reference to the stored data.

8 Claims, 1 Drawing Sheet

DIGITAL MANIPULATION OF VIDEO IMAGES

FIELD OF THE INVENTION

This invention relates to the digital manipulation of video images, for example in the creation of works to be broadcast or distributed as films or video records on other media such as discs or tapes.

BACKGROUND TO THE INVENTION

There are many ways of digitally manipulating images. One type of manipulation includes at the 'matting' of image components. Typically these techniques involve the use of a camera to record an actor, or other subject, in front of a background of an even colour. This colour is often blue, hence the generic description of these techniques as 'Bluescreen' techniques. The picture signal is then analysed to be either pixels of blue [where the background is] or not blue, where the subject is. This digital selector map is referred to as a 'key' image. Another image is then selected, such as an outdoor scene. By using the key image to select between the two images, it is possible to create a composite image of the foreground actor against the chosen background. These techniques can be performed on motion picture sequences, by processing serially each frame. The Ulitimatte Corporation produce systems that perform this function, and has done so for many years. These systems are well known for use in producing images which appear "realistic".

A second mode of creating images is using a '3-D' modelling system. Such systems are available from many manufacturers, including the Canadian company Softimage, and the '3-D Studio-Max' product from Kinetix, who are a division of Autodisk, a US Corporation. With these products, scenes are constructed as '3-D' models, thus specifying a geometrical arrangement between all of the 3-D items in the scene both in orientation and in distance. A 'camera' view is then specified, together with a camera 'track' and then the resultant view calculated on a frame by frame basis. These systems are well known for producing an 'unreal' look, and are often used to give 'fantasy' or 'science fiction' style images.

GB-A2317299 of Pandora International Limited discloses techniques for utilising a digital colour processing system, such as Pandora's POGLE DCP system, to locate areas of picture for changing. For example, consider the processing of a real scene which contains a brick wall. GB-A2317299 discloses techniques to locate the area of brick wall, using known parameters of brick wall texture, and brick wall, reddish-brown. Once this area has been detected, there are disclosed techniques to produce items of other textures in its place, such as a marble wall. The marble texture can be generated using the 'OpenGL' graphics descriptor language, as produced by The Silicon Graphics Incorporated, of Mountain View, Calif., USA.

Whilst these techniques are very useful, there are limitations and problems may occur with these methods under certain circumstances. Consider a scene that contains a brick wall, a street lamp, a post box, and a red car. The brick wall looks a natural part of the scene because of the ambient lighting affects. These include the light falling on the brick wall, making a higher luminance at one end of the wall than the other. There may also be a shadow of the post box which falls on the brick wall, causing a definite geometric region of the wall where there is less luminance. If the car is brightly lit, and is of a 'shiny' appearance, the car may also reflect some red light onto the wall.

Simply using the techniques disclosed in GB-A-2317299 would result in the replacement of this brick wall with a flat lit wall of, say, marble texture. Because of the loss of the uneven light on the wall, the 'shadow' of the post box, and the reflections of the red car, the composite image would look artificial.

SUMMARY OF THE INVENTION

Viewed from one aspect, the prevention invention provides a method for the digital manipulation of a video image, comprising the steps of locating a first object in the image, determining a base set of appearance parameter values for the first object, analysing the first object by selected regions and in respect of each selected region of the first object determining the extent to which actual appearance parameter values deviate from the base act of appearance parameter values, storing data representative of the positions of the regions and the respective deviations from the base set of values, replacing the first object by a second object, and applying to regions of the second object adjustments to appearance parameter values by reference to the stored data concerning the positions of the regions and the respective deviations from the base set of appearance parameter values.

Thus, the second object can be adjusted to have areas of increased light, shadows, reflected light and so forth that were apparent on the original object so as to provide a more lifelike affect. The second object may be an entirely different object, for example the replacement of one person for another or one type of car for another. It could be a real image previously recorded or a computer generated image. Alternatively the second object could be the first image to which a different texture or the like has been applied—such as the conversion of a brick wall to a marble wall as discussed above. The regions of the first object which are analysed and the regions of the second object which are adjusted will normally be the pixels making up the object, although either operation could be done on groups of pixels. The adjustment of the appearance parameters values for the second object could be done after the second object has been placed into the image, or beforehand or simultaneously.

BRIEF DESCRIPTION OF THE DRAWINGS

The invention will be better understood by reference to the following description of preferred embodiments in conjunction with the following drawings, in which:

Referring now to FIG. 1, A telecom machine 1 is linked to a digital colour processor (DCP) 2 such as the POGLE from Pandora International, described for example in U.S. Pat. No. 5,450,500. The colour corrected output from the DCP2 can be supplied to suitable storage means such as a disk array 6 or a video tape recorder 7.

Figure 1:
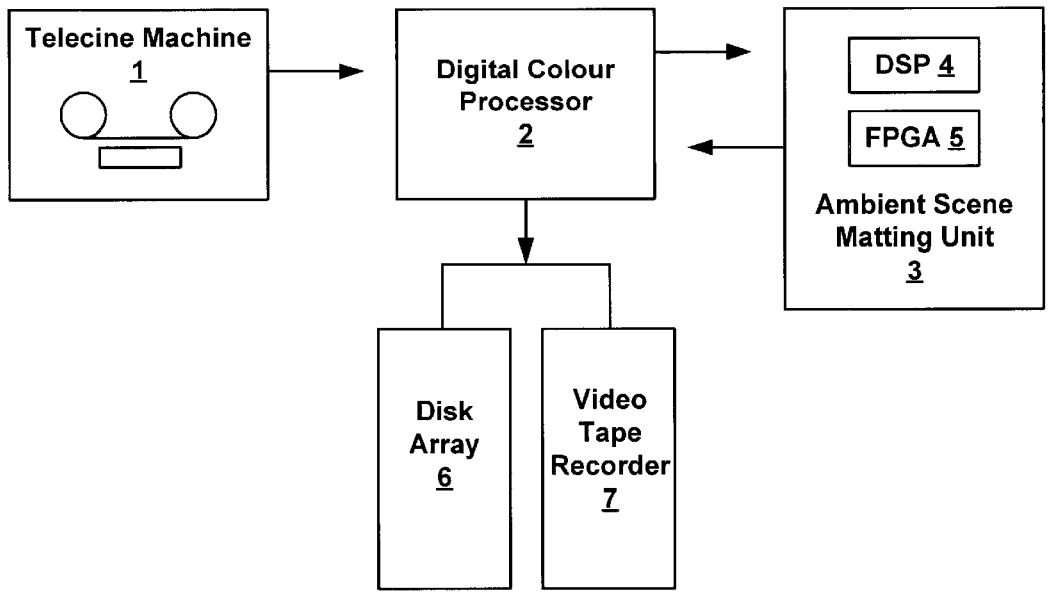
FIG. 1 is a general diagrammatic view of a system for use in accordance with the present invention.
Figure 2:
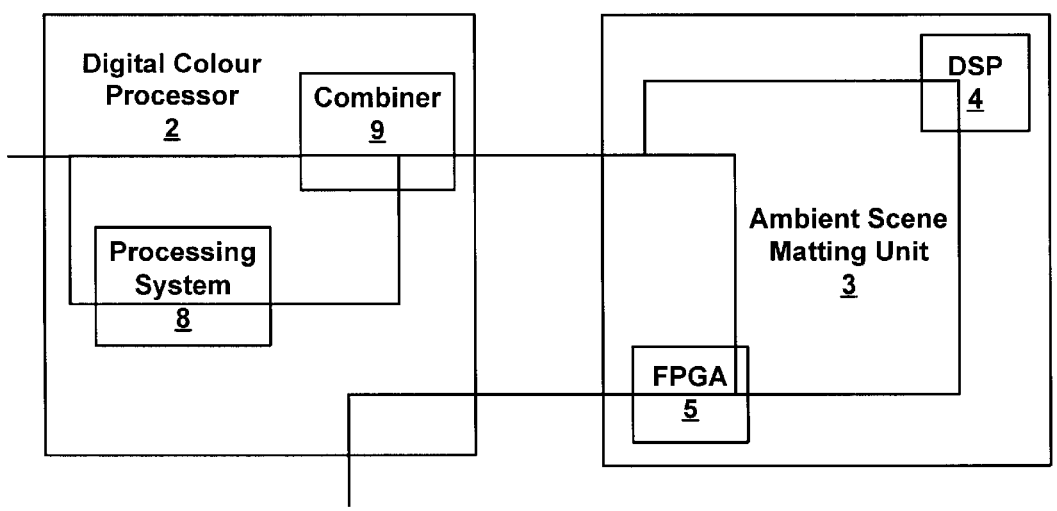
FIG. 2 is a diagram of part of the system showing the signal path.

In accordance with the invention, the signal from the DCP 2 is routed through an ambient scene matting unit 3, containing a digital signal processor (DSP) 4 and a field programmable gate array (FPGA) 5, before being fed to the storage means. The DSP may comprise a Texas TMS320C6203 fixed point digital signal processor, available from Texas Instruments, Houston, Tex. Such chips may have for example 7 Mbits of on chip RAM and can be clocked at 300 MHz. A suitable field programmable gate array could be from the VIRTEX-E 1.8 v range available from the XILINX Corporation. Such array can contain up to 3.2 million gates.

The generation of the ambient scene matte can be performed in non-real time if necessary. For ease of operation, the application of the matte to new scenes needs to performed in real time. the DSP 4 is best suited to the calculation of the matte, as this represents the computationally most intensive operation, and real time is not required. On the other hand, the application of the matte is best suited to the FPGA.

Within the DCP 2, as described for example in U.S. Pat. No. 5,450,500, the primary video signal path passes straight through whereas a secondary control signal path passes through a processing system 8 and is combined with the primary signal path at 9. Within the ambient scene matting unit 3, the primary video signal passes through the FPGA 5. A secondary control signal path is through the DSP 4, which effectively takes a copy of the data and deduces the ambient matte control data. This is fed to the FPGA 5, which pulls the matte from the scene and replaces the matte on the modified scene.

In use of the system, in one example an operator will use a suitable data entry device (such as a tablet, pen, mouse, draw-on screen etc.) to locate an object such as a brick wall. Alternatively this could be done by means of an automatic algorithm. One implementation would be to use a tablet and stylus to draw around the wall. The human operator realises cognitively that the wall is actually made of bricks all of the same colour, whereas due to scene lighting etc. they may have a different appearance. Having drawn around this area, there is determined a bass level of wall appearance parameters, either by taking an 'average' (ie. a mean or a median), or manual entry or editing of a numeric value. This can be substracted from the actual pixel values to determine and 'ambience' matte.

The next step is to replace the brick wall texture with a marble wall texture with a uniform base level. Then, the 'ambient matte' is added back to the new all. This will cause the addition of all of the natural cues back to the scene such as highlights and shadows.

It has been determined that this ambient matte should preferably contain colour information, so as e.g. to store the coloured reflections of an object. Thus the ambience matte is preferably either a '3 colour' matte (for example, Red, Green or Blue), or a 'Luminance-Chrominance' system.

In a further development of this system, 'scene understanding' algorithms can be used to decompose the picture into 'segments' or 'objects'. Such algorithms are described in W. K. Pratt's book "Digital Image Processing", published 1978 by John Wiley & Sons Inc., ISSN 0-471-01888-0, pages 542–547. Thus, having automatically broken down a scene into a number of distinct objects, it is possible to 'ambience matter' one or more objects in the scene.

In a preferred system, as regards the identification of the object to be 'ambient matted', this can be either by manually drawing around it, and/or by identifying it by a combination of one or more appearance parameters that can be used to isolate regions. Such isolation techniques are disclosed in U.S. Pat. No. 5,450,500. It is possible to isolate on a region defined by an upper and lower luminance levels, upper and lower chrominance value 1, and upper and lower primary chrominance 2 (as there are two values of chrominance need to define colours). Note that the definition process can also utilise parameters such as 'sharpness' and 'texture'.

Once the target has been identified, it is necessary to determine the ambience matte. In a simple system this relies on the fact that most objects are basically a uniform colour. For example, most motor cars are the same colour all over, and most bricks in a building are the same colour, etc. Whilst it is realised that there are always exceptions to this, it is still true in most cases. The actual base luminance and colour levels of the objects are determined above which lighting highlights raise the levels, and below which level the shadows drop. This base level is usually a constant level for the object, but could have a 'profile' in a given direction to compensate for objects that are not the same colour all over. Determination can be from either an operator entered value (or set of values for each colour), or derived as a statistical function of the picture elements in the region. This statistical function may be mean, median, or other function. An operator may identify a region of the object which is not operated by lighting, shadows, reflections etc. and use or instruct the system to use the value in that region as the base values. The deviations from the base level are determined by e.g. a process of subtraction and can have positive and negative values for various parts of the object. This is the 'ambience matte'.

The object in the scene is replaced with any other object desired. This object can either be a generated texture (such as marble), an object from another scene (such as a car or other object), or anything else such as a computer generated image. The ambience matte is then added back to the scene. This will recreate the ambient lighting of the scene. Note that for editorial purposes it can be desirable to scale the levels of the ambient matte, either to enhance or reduce the effect of this matte. This can be done by multiplying the matte pixel values by a value between, say, 50% and 150%.

The parameters that could be used in carrying out the invention could include any of hue, saturation and luminance. For example, an object which is partly in shade will exhibit different luminance values at different points. If part of an object is lit by coloured light, or reflects the colour of another object, there may be a change in hue. Other more complex parameters such as at least one texture related parameter may be defined in the Fourier domain.

Thus, in accordance with preferred embodiments of the present invention there is provided a method for the digital manipulation of a video image, in which an object is located and replaced by another object. To account for ambient lighting effects, a base set of appearance parameter values for the first object is determined, such as average values of hue, saturation and luminance. Selected regions of the object are analysed and in respect of each selected region the extent to which actual appearance parameter values deviate from the base set of appearance parameter values is determined. The method includes storing data representative of the positions of the regions and the respective deviations from the base set of value. The first object is replaced by a second object, and the method then includes the step of applying to regions of the second object adjustments to appearance parameter values by reference to the stored data.

What is claimed is:

1. A method for the digital manipulation of a video image, comprising the steps of locating a first object in the image, determining a base set of appearance parameter values for the first object, analysing the first object by selected regions and in respect of each selected region of the first object determining the extent to which actual appearance parameter values deviate from the base set of appearance parameter values, storing data representative of the positions of the regions and the respective deviations from the base set of values, replacing the first object by a second object, and applying to regions of the second object adjustments to appearance parameter values by reference to the stored data concerning the positions of the regions and the respective deviations from the base set of appearance parameter values.

2. A method as claimed in claim 1, wherein the deviation of the actual appearance values from the base set of values is a function of ambient lighting.

3. A method as claimed in claim 1, wherein the appearance parameter values include any of hue, saturation and luminance.

4. A method as claimed in claim 3, wherein the appearance parameter values further include at least one texture related parameter.

5. A method as claimed in claim 1, wherein the base set of appearance parameter values is determined by statistical analysis of appearance parameter values in different regions of the object.

6. A method as claimed in claim 5, wherein the statistical analysis includes the calculation of average appearance parameter values.

7. A method as claimed in claim 1 wherein the base set of appearance parameter value is determined from the values of appearance parameters in a region of the first object which has been selected as typical.

8. A method as claimed in claim 1, wherein the second object is a retextured version of the first object.

* * * * *